(12) United States Patent
Choi et al.

(10) Patent No.: US 11,697,109 B2
(45) Date of Patent: Jul. 11, 2023

(54) CATALYST PARTICLES FOR TREATING VEHICLE EXHAUST GAS, PREPARATION METHOD THEREFOR, AND METHOD FOR TREATING VEHICLE EXHAUST GAS BY USING SAME

(71) Applicant: LG Hausys, Ltd., Seoul (KR)

(72) Inventors: Kyeong-Woo Choi, Seoul (KR); Dong-Il Lee, Seoul (KR); Won-Ji Hyun, Seoul (KR); Jong-Sik Choi, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 620 days.

(21) Appl. No.: 16/632,691

(22) PCT Filed: Apr. 4, 2018

(86) PCT No.: PCT/KR2018/003966
§ 371 (c)(1),
(2) Date: Jan. 21, 2020

(87) PCT Pub. No.: WO2019/017564
PCT Pub. Date: Jan. 24, 2019

(65) Prior Publication Data
US 2020/0222880 A1    Jul. 16, 2020

(30) Foreign Application Priority Data
Jul. 19, 2017 (KR) .................. 10-2017-0091690

(51) Int. Cl.
*B01J 23/46* (2006.01)
*B01D 53/94* (2006.01)
*B01J 21/04* (2006.01)
*B01J 21/06* (2006.01)
*B01J 23/42* (2006.01)
*B01J 23/44* (2006.01)
*B01J 35/00* (2006.01)
*B01J 35/02* (2006.01)
*B01J 37/02* (2006.01)
*B01J 37/04* (2006.01)
*B01J 37/08* (2006.01)
*B01J 37/34* (2006.01)
*F01N 3/28* (2006.01)

(52) U.S. Cl.
CPC ............ *B01J 23/462* (2013.01); *B01D 53/94* (2013.01); *B01J 21/04* (2013.01); *B01J 21/063* (2013.01); *B01J 23/42* (2013.01); *B01J 23/44* (2013.01); *B01J 35/0013* (2013.01); *B01J 35/023* (2013.01); *B01J 37/0219* (2013.01); *B01J 37/0221* (2013.01); *B01J 37/0236* (2013.01); *B01J 37/04* (2013.01); *B01J 37/08* (2013.01); *B01J 37/345* (2013.01); *F01N 3/28* (2013.01); *B01D 2255/1021* (2013.01); *B01D 2255/1023* (2013.01); *B01D 2255/1025* (2013.01); *F01N 2330/06* (2013.01); *F01N 2370/02* (2013.01)

(58) Field of Classification Search
CPC ........ B01J 23/462; B01J 21/04; B01J 21/063; B01J 23/42; B01J 23/44; B01J 35/0013; B01J 35/023; B01J 37/0219; B01J 37/0221; B01J 37/0236; B01J 37/04; B01J 37/08; B01J 37/345; B01D 53/94; B01D 2255/1021; B01D 2255/1023; B01D 2255/1025; F01N 2330/06; F01N 2370/02
USPC ... 502/5, 325, 304, 305, 313, 349, 350, 178; 423/213.2, 213.5, 239.1
See application file for complete search history.

(56) References Cited

U.S. PATENT DOCUMENTS

| | | | | |
|---|---|---|---|---|
| 3,822,220 | A * | 7/1974 | Veltman | ................. B01J 37/348 |
| | | | | 502/305 |
| 6,153,159 | A | 11/2000 | Engeler et al. | |
| 6,488,906 | B1 * | 12/2002 | Mori | ...................... B01D 53/56 |
| | | | | 423/239.1 |
| 2010/0008832 | A1 * | 1/2010 | Oosumi | ................... B01J 23/63 |
| | | | | 422/177 |
| 2012/0302429 | A1 | 11/2012 | Sogabe et al. | |
| 2013/0123094 | A1 | 5/2013 | Sogabe et al. | |

FOREIGN PATENT DOCUMENTS

| | | | | |
|---|---|---|---|---|
| CN | 101992096 | * | 3/2011 | ............ B01J 23/464 |
| CN | 101992096 | A | 3/2011 | |
| CN | 102773098 | A * | 11/2012 | |
| CN | 103402627 | * | 11/2013 | ............. F01N 3/103 |
| CN | 103402627 | A | 11/2013 | |
| CN | 105478136 | A * | 4/2016 | |
| CN | 105536787 | * | 5/2016 | ......... B01D 53/8687 |
| CN | 105536787 | A | 5/2016 | |
| CN | 105879867 | * | 8/2016 | ............ B01J 23/626 |
| CN | 105879867 | A | 8/2016 | |
| CN | 106622225 | * | 5/2017 | ......... B01D 53/8662 |
| CN | 106622225 | A | 5/2017 | |
| EP | 1066874 | A1 * | 1/2001 | ........... B01D 53/945 |
| EP | 3103977 | B1 * | 5/2018 | ............... F01N 3/02 |
| JP | 5-115782 | A | 5/1993 | |

(Continued)

OTHER PUBLICATIONS

Kana Kimura et al., Preparation of highly dispersed platinum catalysts on various oxides by using polymer-protected nanoparticles, Catalysis Today, Nov. 3, 2010, Japan.
Ji Young Kim et al., Synthesis of Pt@TiO2 Nano-composite via Photochecmical Reduction Method, J. Kor. Powd. Met. Inst., vol. 21, No. 2, Apr. 14, 2014, Seoul, South Korea. English Abstract.
Extended European Search Report dated Jun. 24, 2020 in connection with the counterpart European Patent Application No. EP18834477.4.

(Continued)

Primary Examiner — Patricia L. Hailey
(74) Attorney, Agent, or Firm — Hauptman Ham, LLP

(57) ABSTRACT

Provided are catalyst particles for treating vehicle exhaust gas, containing semiconductor nanoparticles supported by noble metals.

12 Claims, 2 Drawing Sheets

(56) References Cited

FOREIGN PATENT DOCUMENTS

Figure 1:
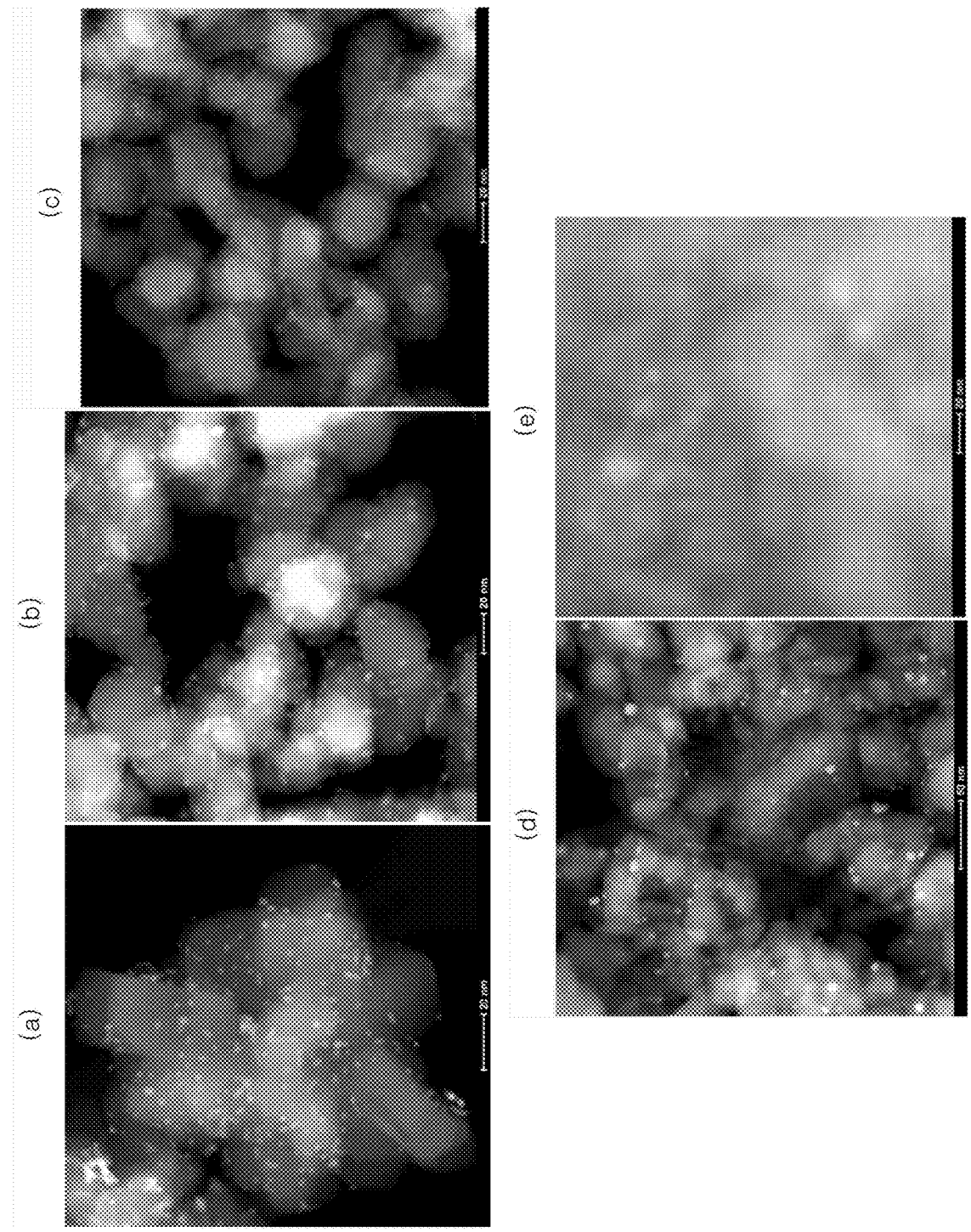

| JP | 2001-29746 | A |   | 2/2001 |          |
|----|------------|---|---|--------|----------|
| JP | 2001-239161 | A |   | 9/2001 |          |
| JP | 2002-102704 | A |   | 4/2002 |          |
| JP | 3902670 | B2 | * | 4/2007 | ............ B01D 53/56 |
| JP | 2010-005531 | A |   | 1/2010 |          |
| JP | 2012-245461 | A |   | 12/2012 |         |
| JP | 2017221868 | A | * | 12/2017 | ........... B01D 53/944 |
| KR | 10-2004-0000893 | A |   | 1/2004 |      |
| KR | 10-0587240 | B1 |   | 6/2006 |         |
| KR | 10-0989224 | B1 |   | 10/2010 |        |
| KR | 10-2012-0104272 | A |   | 9/2012 |     |
| KR | 10-1473440 | B1 |   | 12/2014 |        |
| KR | 10-2015-0086290 | A |   | 7/2015 |     |
| WO | 2016094399 | A1 |   | 6/2016 |         |
| WO | 2016183678 | A1 |   | 11/2016 |        |

OTHER PUBLICATIONS

Korean Office Action dated Jul. 28, 2020, in connection with the Korean Patent Application No. 10-2017-0091690 citing the above reference(s).

International Search Report dated Jul. 24, 2018 for corresponding international application No. PCT/KR2018/003966, cited above references.

Japanese Office Action dated Feb. 5, 2021, in connection with the Japanese Patent Application No. 2020-502173 citing the above reference(s).

Chinese Office Action dated May 18, 2022, in connection with the Chinese Patent Application No. 201880047444.7 citing the above reference(s).

* cited by examiner

CATALYST PARTICLES FOR TREATING VEHICLE EXHAUST GAS, PREPARATION METHOD THEREFOR, AND METHOD FOR TREATING VEHICLE EXHAUST GAS BY USING SAME

CROSS-REFERENCE TO RELATED APPLICATION

The present application is a national stage filing under 35 U.S.C § 371 of PCT application number PCT/KR2018/003966 filed on Apr. 4, 2018 which is based upon and claims the benefit of priority to Korean Patent Application No. 10-2017-0091690 filed on Jul. 19, 2017, in the Korean Intellectual Property Office, which is incorporated herein in its entirety by reference.

TECHNICAL FIELD

The present disclosure relates to a catalyst particle for treating vehicle exhaust gas, a preparation method thereof, and a method for treating vehicle exhaust gas using the catalyst particle.

DESCRIPTION OF RELATED ART

Exhaust gases emitted from internal combustion engines such as gasoline engines and diesel engines contain substances harmful to the environment and the human body, such as carbon monoxide (CO), hydrocarbons (THC, total hydrocarbon) and nitrogen oxides (NOx). In recent years, due to the rise of global environmental awareness, there has been a great demand for improving performance of catalysts for treating exhaust gases used to convert these exhaust gas components into carbon dioxide, nitrogen, oxygen, water, and the like which in turn are discharged out.

One of challenges related to the catalyst for treating the exhaust gas prevents aging phenomenon of the catalyst to improve the catalyst life. Conventionally, a catalyst for treating vehicle exhaust gas was prepared by loading a noble metal on a carrier via ionic impregnation and thermal firing treatment. On the other hand, such a catalyst has a problem that treatment performance of the exhaust gas thereof is significantly reduced when the catalyst is exposed to an actual vehicle driving environment for a long time.

DISCLOSURE

Technical Purposes

One embodiment of the present disclosure is to provide a catalyst particle for treating the vehicle exhaust gas in which the catalyst particle includes a semiconductor nanoparticle supporting a noble metal thereon via light irradiation, wherein growth and aggregation of the noble metal are suppressed even in a high temperature environment, thereby to achieve excellent catalyst life.

Another embodiment of the present disclosure is to provide a preparation method of catalyst particle for treating vehicle exhaust gas in which the catalyst particle includes a semiconductor nanoparticle supporting a noble metal thereon via light irradiation, the catalyst particle having excellent catalyst life.

Another embodiment of the present disclosure is to provide a method of treating vehicle exhaust gas using the catalyst particle for treating the vehicle exhaust gas.

Technical Solutions

In one embodiment of the present disclosure, there are provided a catalyst particle for treating vehicle exhaust gas including a semiconductor nanoparticle supporting a noble metal thereon.

In another embodiment of the present disclosure, there is provided a preparation method of a catalyst particle for treating the vehicle exhaust gas, the method including adding a noble metal precursor to a suspension containing a semiconductor nanoparticle dispersed therein to form a mixture; irradiating the mixture with light to produce a semiconductor nanoparticle supporting a noble metal thereon.

In another embodiment of the present disclosure, there is provided a method for treating vehicle exhaust gas using the catalyst particle for treating the vehicle exhaust gas.

Technical Effects

The catalyst particle for treating the vehicle exhaust gas includes the semiconductor nanoparticle loaded with the noble metal by light irradiation, which allows the noble metal to be uniformly loaded in a small nano-size, thereby treating the exhaust gas via improved oxidation and reduction reactions. In the catalyst particle for treating the vehicle exhaust gas, the growth and aggregation of the noble metal are significantly inhibited even in a high temperature environment, thereby to exhibit excellent catalyst life while containing a small amount of the noble metal.

BRIEF DESCRIPTION OF DRAWINGS (a) to (e) of FIG. 1 respectively show HAADF-STEM (High-Angle Annular Dark-Field Scanning-Transmission Electron Microscopy) images of a catalyst particle for treating vehicle exhaust gas as produced according to Present Examples 1 to 4 and Comparative Example 1.

Figure 2:
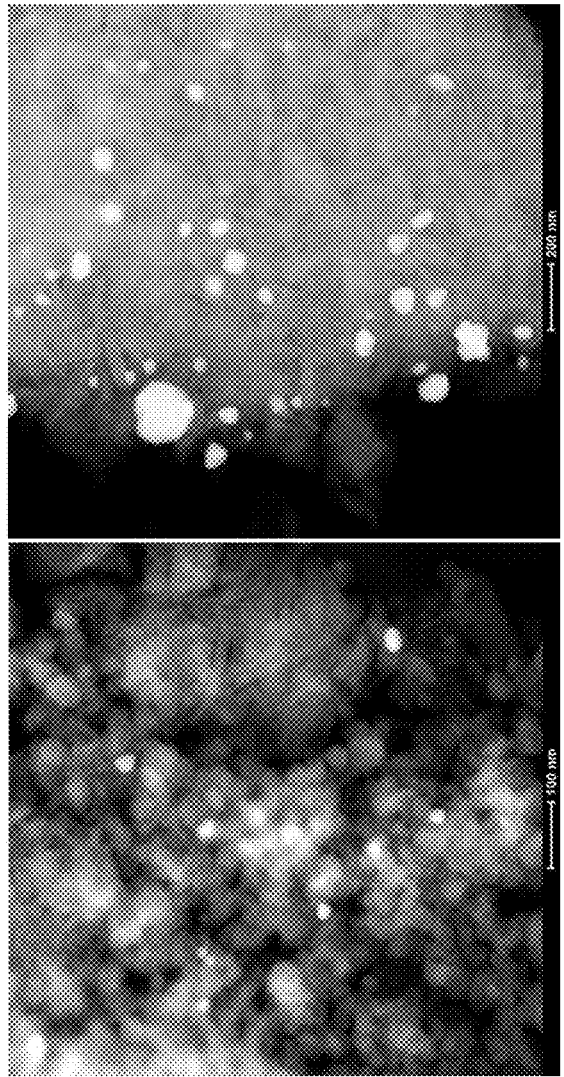

(a) and (b) of FIG. 2 respectively show HAADF-STEM (High-Angle Annular Dark-Field Scanning-Transmission Electron Microscopy) images after 24 hours aging treatment of a catalyst particle to treat vehicle exhaust gas as produced according to Present Example 4 and Comparative Example 1.

DETAILED DESCRIPTIONS

Advantages and features of the present disclosure and methods of accomplishing the same will become apparent with reference to the embodiments described below. The present embodiments merely allow the present disclosure to be complete, and completely inform the scope of the invention to those of ordinary skill in the technical field to which the present disclosure belongs. The present disclosure is only defined by the scope of the claims.

In the drawings, thicknesses of layers, and regions, etc., are exaggerated for clarity. In the drawings, for convenience of description, thicknesses of some layers and regions are exaggerated. Like reference numerals refer to like elements throughout the drawings.

In one embodiment of the present disclosure, there is provided a catalyst particle for treating vehicle exhaust gas including a semiconductor nanoparticle supporting a noble metal thereon.

Conventionally, a catalyst for treating vehicle exhaust gas was prepared by loading a noble metal on a carrier via ionic impregnation and thermal firing treatment. When these catalysts are exposed to hot exhaust gases generated during actual vehicle driving, aging of the catalyst causes irreversible deformation of the catalyst containing a noble metal, resulting in a significant degradation of the exhaust gas treatment performance. For example, diesel engines produce high-temperature exhaust gases close to about 750° C. and gasoline engines to about 1000° C. Over time, the noble metal contained in the catalyst reacting with the hot exhaust gas shows poisoning and fouling. The noble metal aggregate and sinter, such that internal diffusion of a noble metal may occur. As a result, the noble metal serving as a main catalyst may be lost. Further, decrease in a surface area of catalysts containing the noble metal may occur, which may significantly reduce the exhaust gas treatment performance of the catalyst. In addition, the high temperature exhaust gas may collapse a surface structure of a carrier containing the noble metal. As a result, the noble metal particle are buried in the carrier or doped in the carrier, or internal diffusion of the noble metal is accelerated, thereby deteriorating the exhaust gas treatment performance.

In order to solve the problem, one approach may increase the content of a noble metal contained in the catalyst. However, in this approach, due to a high price of a noble metal, a production cost of the catalyst may increase rapidly, which is uneconomical. Further, this approach may have a limit to preventing the aging of the catalyst.

A catalyst particle for treating the vehicle exhaust gas includes a semiconductor nanoparticle loaded with a noble metal by light irradiation, which allows the noble metal to be uniformly loaded in a small nano-size, thereby treating the exhaust gas via improved oxidation and reduction reactions. In the catalyst particle for treating the vehicle exhaust gas, the growth and aggregation of the noble metal are significantly inhibited even in a high temperature environment, thereby to exhibit excellent catalyst life while containing a small amount of a noble metal.

Specifically, in the catalyst particle for treating the vehicle exhaust gas, the noble metal may be uniformly dispersed, at a smaller nano size, on the semiconductor nanoparticle via light irradiation without additional heat treatment.

For example, when irradiating light having energy greater than a band gap energy of the semiconductor nanoparticle onto the semiconductor nanoparticle, electrons in a valence band of the semiconductor nanoparticle are excited to transition to a conduction band. Thus, holes of the semiconductor nanoparticle may be formed in the valence electron band to generate electron-hole pairs. The electrons thus formed can reduce the noble metal and disperse uniformly the noble metal at a small nanoparticle on the semiconductor nanoparticle. Specifically, the semiconductor nanoparticle may have a band gap of about 0.5 eV to about 10.0 eV.

The catalyst particle to treat the vehicle exhaust gas includes the semiconductor nanoparticle to prevent effectively aggregation, growth, burial and internal diffusion of the noble metal into the semiconductor nanoparticle to prevent the aging of the catalyst.

The semiconductor nanoparticle includes one selected from a group consisting of titanium dioxide ($TiO_2$), tungsten trioxide ($WO_3$), silicon carbide (SiC), cerium dioxide ($CeO_2$), zirconium dioxide ($ZrO_2$), iron oxide ($Fe_2O_3$), and combinations thereof.

For example, the semiconductor nanoparticle may include rutile titanium dioxide. Catalyst particle for treating the vehicle exhaust gas include rutile titanium dioxide as the semiconductor nanoparticle, such that the phase change of the semiconductor nanoparticle may be prevented even at a high temperature of exhaust gas of several hundred degrees Celsius to about 1000 degrees Celsius. Thus, this may prevent a surface structure collapse of the catalyst containing the semiconductor nanoparticle to prevent the aging of the catalyst.

The semiconductor nanoparticle may have an average particle diameter of about 10 nm to about 500 nm, specifically, may have an average particle diameter of about 20 nm to about 200 nm. Herein, a 'particle size' may be measured as a number average particle diameter by image analysis using SEM, TEM, or HAADF-STEM (High-Angle Annular Dark-Field Scanning-Transmission Electron Microscopy).

The catalyst particle for treating the vehicle exhaust gas may include one selected from a group consisting of ruthenium (Ru), rhodium (Rh), palladium (Pd), osmium (Os), iridium (Ir), platinum (Pt) and a combination thereof as the noble metal dispersed on the semiconductor nanoparticle. The noble metal may act as a main catalyst contained in the catalyst particle for treating the vehicle exhaust gas. The noble metal may be involved in the oxidation and reduction reaction to convert exhaust gas components such as carbon monoxide (CO), hydrocarbons (THC, total hydrocarbon) and nitrogen oxides (NOx) contained in the exhaust gas into carbon dioxide, nitrogen, oxygen, water and the like.

Specifically, the noble metal may be divided into a noble metal of a catalyst particle for treating vehicle exhaust gas in an oxidation reaction manner and a noble metal of a catalyst particle for treating vehicle exhaust gas in a reduction reaction manner. For example, the noble metal having the oxidative reaction activity include platinum (Pt) or palladium (Pd). The noble metal may activate an oxidation reaction that oxidizes carbon monoxide to carbon dioxide and hydrocarbons to carbon dioxide and water.

In addition, the noble metal having reducing reaction activity include rhodium. The noble metal may be used to activate a reaction to reduce nitrogen oxides to carbon dioxide and nitrogen.

In addition, in the catalyst particle for treating the vehicle exhaust gas, the noble metal may be dispersed onto the semiconductor nanoparticle to enhance the exhaust gas treatment capability in certain exhaust gas environments. In addition, the semiconductor nanoparticle may inhibit the growth and aggregation of the noble metal to achieve excellent catalyst life.

For example, when using the catalyst particle in which platinum (Pt) exhibiting excellent activity at low temperatures is supported on the semiconductor nanoparticle, excellent catalyst performance may be realized in an environment in which relatively low temperature exhaust gas is generated, for example, in the diesel gas environment.

Further, when using the catalyst particle in which palladium (Pd) having high stability at high temperatures is supported on the semiconductor nanoparticle, excellent catalyst performance and lifespan may be achieved in an environment in which high temperature exhaust gas is generated, for example, in a gasoline environment.

Further, the noble metal may be supported or supported on the semiconductor nanoparticle in a form of alloys, thereby to achieve further improved oxidation and reduction reactions.

For example, an alloy of platinum (Pt) and palladium (Pd) may be supported on the semiconductor nanoparticle as the noble metal to further improve the oxidation reaction activity.

In another example, platinum (Pt) or palladium (Pd) as the noble metal of the catalyst particle for treating vehicle exhaust gas in an oxidation reaction manner and rhodium (Rh) as the noble metal of the catalyst particle for treating vehicle exhaust gas in the reduction reaction manner may be supported, in a form of alloy therebetween, on the semiconductor nanoparticle. Thus, excellent exhaust gas treatment performance and anti-poisoning have been achieved to improve catalyst life.

Further, the ruthenium (Ru), osmium (Os), or iridium (Ir), etc. and the rhodium (Rh), palladium (Pd), or platinum (Pt), etc. may be supported, in a form of alloy therebetween, on the semiconductor nanoparticle, thereby to improve physical and chemical properties such as anti-poisoning, rigidity, and durability, etc.

Specifically, the catalyst particle for treating the vehicle exhaust gas may include the noble metal in an amount of about 1 part by weight to about 50 parts by weight based on 100 parts by weight of a solid content of the semiconductor nanoparticle. For example, the noble metal may be included in an amount of about 1 part by weight to about 32 parts by weight based on 100 parts by weight of the solid state the semiconductor nanoparticle.

The catalyst particle for treating the vehicle exhaust gas may contain the noble metal in the above content range and thus may exhibit significantly improved exhaust gas treatment due to improved oxidation and reduction reactions of the noble metal. Even in high temperature exhaust gas environments, the noble metal may be significantly inhibited from growing, aggregating, being buried in the particle and being internally diffused. Thus, although the catalyst contains a small amount of the noble metal, the catalyst may exhibit superior catalyst life.

For example, the exhaust gas treatment may not be sufficient if the catalyst contains the noble metal in an amount below the above content range. When the content of the noble metal exceeds the above content range, a production cost thereof increases, the aggregation and growth of the noble metal may be accelerated, and the exhaust gas treatment capacity is lowered.

The life of the catalyst may be significantly reduced.

The noble metal contained in the catalyst particle for treating the vehicle exhaust gas may have an average particle diameter of about 1 nm to about 30 nm and may be dispersed on the semiconductor nanoparticle. Specifically, the noble metal may be dispersed on the semiconductor nanoparticle while the noble metal has an average particle diameter of about 1 nm to about 20 nm. When the noble metal particles are evenly dispersed on the semiconductor nanoparticle while the noble metal has an average particle diameter in the above range, the exhaust gas may be treated with improved redox reactions. Further, even in a high temperature exhaust gas environment, growth and aggregation of the noble metal may be greatly suppressed.

Specifically, when the average particle diameter of the noble metal is smaller than the above range, the aggregation and growth of the noble metal may be accelerated due to Ostwald Ripening. When the average particle diameter of the noble metal is larger than the above range, the reaction surface area may decrease, thereby reducing the exhaust gas treatment capacity.

Thus, the catalyst particle for treating the vehicle exhaust gas including the noble metal with the average particle diameter in the above range may maintain a large surface area to further improve the catalyst performance.

The catalyst particle to treat the vehicle exhaust gas may activate the redox reaction without additional treatment thereto, for example without light irradiation thereto. Specifically, the catalyst particle for treating the vehicle exhaust gas are involved in the oxidation/reduction reaction as follows, without additional UV irradiation thereto to induce the catalyst activity. Thus, carbon monoxide (CO), hydrocarbons (THC), and nitrogen oxides (NOx) contained in the exhaust gas may be converted into carbon dioxide, nitrogen, oxygen, water, and the like.

i) Oxidation reaction of carbon monoxide: $CO+O_2 => CO_2$ ii) Oxidation reaction of hydrocarbons: $C_xH_{2x+2}+O_2 => CO_2+H_2O$ iii) Reduction reaction of nitrogen oxides: $NO+CO => CO_2+N_2$ The catalyst particle for treating the vehicle exhaust gas further includes a porous ceramic carrier, and thus has a large surface area and thus is involved in excellent oxidation and reduction reactions to treat the exhaust gas.

The porous ceramic carrier may be embodied as a particle having an average particle diameter of about 0.5 μm to about 10 μm. Specifically, the porous ceramic carrier may be embodied as a particle having an average particle diameter of about 0.5 μm to about 5 μm. The catalyst particle for treating the vehicle exhaust gas may include the porous ceramic carrier with an average particle diameter in the above range.

The porous ceramic carrier may act as a support for supporting the above-described semiconductor nanoparticle loaded with the noble metal and thus may contribute to a thermal stability of the catalyst particle. The porous ceramic carrier may serve as a support for reliably supporting the semiconductor nanoparticle loaded with the noble metal even in a high temperature environment.

The catalyst particle for treating the vehicle exhaust gas may further include the porous ceramic carrier to effectively disperse the noble metal-supporting semiconductor nanoparticle. Therefore, this may suppress the aggregation and growth of the noble metal to further improve the catalyst life.

Further, the porous ceramic carrier has a porous structure that allows a reactant to be easily adsorbed thereto. Thus, the catalyst reaction of the semiconductor nanoparticle loaded with the noble metal and dispersed on the porous ceramic carrier may be further promoted.

Thus, the catalyst particle for treating the vehicle exhaust gas includes the porous ceramic carrier such that even in a high temperature exhaust gas environment, the noble metal supported and supported on the semiconductor nanoparticle dispersed on the porous ceramic carriers may be significantly prevented from growing, agglomerating, being buried in the semiconductor particle and internally diffusing. Thus, the catalyst particle for treating the vehicle exhaust gas containing the noble metal may exhibit excellent catalyst life while containing a small amount of the noble metal.

The porous ceramic carrier may include one selected from a group consisting of aluminum oxide ($Al_2O_3$), ceria ($CeO_2$), zirconia ($ZrO_2$), silica ($SiO_2$), titanium dioxide ($TiO_2$), silicon carbide (SiC), cerium zirconium oxide and combinations thereof.

The catalyst particle for treating the vehicle exhaust gas may include the porous ceramic carrier in a weight ratio of about 1:1 to about 1:100 relative to the semiconductor nanoparticle. For example, the catalyst particle for treating the vehicle exhaust gas may include the porous ceramic carrier in a weight ratio of about 1:1 to about 1:30 relative to the semiconductor nanoparticle. Specifically, the catalyst particle for treating the vehicle exhaust gas may include the porous ceramic carrier in a weight ratio of about 1:3 to about 1:20 relative to the semiconductor nanoparticle. In a case where the content of the semiconductor nanoparticle exceeds the above range, the semiconductor nanoparticle and the noble metal are not dispersed properly, and thus, catalyst aging due to the noble metal aggregation cannot be effectively suppressed. When the content of the porous ceramic carrier exceeds the above range, the content of the noble metal in the catalyst may not be sufficient, thereby degrading the vehicle exhaust gas treatment capacity.

Another embodiment of the present disclosure provides a preparation method of the catalyst particle for treating the vehicle exhaust gas. The preparation method of the catalyst particle for treating the vehicle exhaust gas may include adding a noble metal precursor to a suspension containing a semiconductor nanoparticle dispersed therein to form a mixture; irradiating the mixture with light to produce a semiconductor nanoparticle supporting a noble metal thereon.

The above mentioned catalyst particle for treating the vehicle exhaust gas may be produced by the preparation method of catalyst particle for treating the vehicle exhaust gas.

Specifically, the semiconductor nanoparticle may be included in an amount of about 0.1 wt % to about 50 wt % in the suspension based on a weight of the suspension. For example, the semiconductor nanoparticle may be included in an amount of about 0.5 wt % to about 20 wt % in the suspension based on a weight of the suspension. When the content of the semiconductor nanoparticle is smaller than the above range, it is difficult to secure the semiconductor nanoparticle supporting a sufficient amount of a noble metal thereon. This increases the number of production processes. Thus, the cost of the production rises. If the content of the semiconductor nanoparticle is larger than the above range, penetration of the irradiated light therethrough becomes difficult. Thus, there may be a problem that the photoreaction is insufficient and thus a shape and distribution of the noble metal cannot be controlled.

The noble metal precursor may comprise one selected from a group consisting of $PtCl_2$, $H_2PtCl_6$, $PdCl_2$, $Na_2PdCl_4$, $K_2PdCl_4$, $H_2PdCl_4$, $RhCl_3$, $Na_3RhCl_6$, $K_3RhCl_6$, $H_3RhCl_6$ and combinations thereof.

For example, the noble metal precursor may include Pt precursors such as $PtCl_2$, $H_2PtCl_6$, Pd precursors such as $PdCl_2$, $Na_2PdCl_4$, $K_2PdCl_4$, $H_2PdCl_4$, and Rh precursors such as $RhCl_3$, $Na_3RhCl_6$, $K_3RhCl_6$, and $H_3RhCl_6$, the like.

The mixture may further contain a sacrificial agent. The sacrificial agent removes holes generated in semiconductor nanoparticle by light irradiation. Thus, electrons generated in semiconductor nanoparticle may be able to efficiently reduce a noble metal. This can increase the activity of the catalyst.

The sacrificial agent may be included in an amount of about 0.1 parts by weight to about 50 parts by weight based on 100 parts by weight of the mixture of the noble metal precursors and the suspension containing the semiconductor nanoparticle. Specifically, when the content of the sacrificial agent is smaller than the above range, there is a problem that the noble metal is not sufficiently reduced. When the content of the sacrificial agent is larger than the above range, the reduction of the noble metal cannot be controlled, resulting in uneven particle dimeter distribution and dispersion of a noble metal. Further, most of the sacrificial agents are harmful to the environment and their use is limited.

The sacrificial agent may comprise one selected from a group consisting of methanol, ethanol, isopropanol, formic acid, acetic acid and combinations thereof.

The mixture is irradiated with light to produce the semiconductor nanoparticle loaded with the noble metal thereon. As described above, in the catalyst particle for treating the vehicle exhaust gas, the noble metal as small nanoparticle may be uniformly dispersed on the semiconductor nanoparticle via the light irradiation without additional heat treatment. For example, the light may be irradiated for about 0.5 hours to about 10 hours.

The preparation method of the catalyst particle for treating the vehicle exhaust gas may further include mixing a porous ceramic carrier with the semiconductor nanoparticle supporting the noble metal thereon to produce an aqueous solution; drying the aqueous solution to form a dried mixture; and, then, firing the dried mixture under a temperature condition of about 300° C. to about 700° C.

Using the preparation method may produce the catalyst particle further comprising the above-described porous ceramic carrier on which the semiconductor nanoparticle supporting the noble metal thereon are uniformly dispersed.

The porous ceramic carrier may be embodied as particle having an average particle diameter of about 0.5 µm to about 10 µm. When the catalyst particle for treating the vehicle exhaust gas include the porous ceramic carrier with an average particle diameter in the above range, the catalyst particle may maintain a larger surface area to further improve catalyst performance. Further, the noble metal supported on the semiconductor nanoparticle dispersed on the porous ceramic carrier may be greatly prevented from growth, aggregation, embedding and internal diffusion even in a high temperature exhaust gas environment. Thus, the catalyst particle for treating the vehicle exhaust gas containing the noble metal may exhibit excellent catalyst life while containing a small amount of the noble metal.

Another embodiment of the present disclosure provides a method of treating vehicle exhaust gas using the above defined catalyst particle to treat the vehicle exhaust gas.

The catalyst particle to treat the vehicle exhaust gas may activate the redox reaction without additional treatment, for example without light irradiation. Specifically, the catalyst particle for treating the vehicle exhaust gas are involved in the oxidation/reduction reaction without being irradiated with UV light to have the catalyst activity. Thus, carbon monoxide (CO), hydrocarbons (THC), and nitrogen oxides (NOx) contained in the exhaust gas may be converted into carbon dioxide, nitrogen, oxygen, water, and the like.

In the catalyst particle to treat the vehicle exhaust gas, the noble metal supported and supported on the semiconductor nanoparticle dispersed on the porous ceramic carrier may be greatly prevented from growth, aggregation, embedding and internal diffusion even in a high temperature exhaust gas environment. Thus, the catalyst particle for treating the vehicle exhaust gas containing the noble metal may exhibit excellent catalyst life while containing a small amount of a noble metal.

For example, even when the catalyst particle for treating the vehicle exhaust gas has been subjected to aging treatment for about 24 hours at a high temperature of about 750° C., a diameter size of the noble metal particle of the catalyst particle may be maintained in a range between about 5 nm and about 80 nm.

Hereinafter, specific Examples of the present disclosure will be presented. However, the Examples as described below are merely to specifically illustrate or explain the present disclosure and should not limit the present disclosure.

PRESENT EXAMPLES AND COMPARATIVE EXAMPLES

Present Example 1

Rutile titanium dioxide ($TiO_2$) powders were dispersed in water to produce a 0.5 wt % suspension. While continuously stirring the rutile titanium dioxide suspension, the $H_2PtCl_6$ precursor was mixed therewith so that a content of Pt was 2 parts by weight relative to 100 parts by weight of the rutile titanium dioxide solid. Then, the mixture was stirred for about 10 minutes. As a sacrificial agent, methyl alcohol of 10 parts by weight relative to 100 parts by weight of the mixture between the $H_2PtCl_6$ precursor and the suspension containing the rutile titanium dioxide was added thereto, followed by continuous stirring. Thereafter, while stirring the mixture containing the rutile type titanium dioxide and noble metal precursor continuously, the mixture was irradiated with ultraviolet light for about 2 hours. The mixture after the light irradiation was completed was dried to produce $TiO_2$ catalyst particle loaded with Pt thereon.

Present Example 2

A Pd-supporting $TiO_2$ catalyst particle was produced in the same manner as in Example 1, except that $H_2PdCl_4$ as a noble metal precursor was mixed with the suspension containing rutile titanium dioxide ($TiO_2$) powders.

Present Example 3

A Rh-supporting $TiO_2$ catalyst particle was produced in the same manner as in Example 1, except that $RhCl_3$ as a noble metal precursor was mixed with the suspension containing rutile titanium dioxide ($TiO_2$) powders.

Present Example 4

The Pt-supporting rutile titanium dioxide catalyst particle as produced by Example 1 and $Al_2O_3$ powders were dispersed in water to produce an aqueous solution. Then, a polymer of 4-4'-(1-methylethylidene)bis-phenol and oxirane based monomers as a dispersing agent was added to the aqueous solution which in turn was stirred while gradually removing water at a temperature of 60° C. After most of the water has been removed, the solution was stirred once more and dried at a temperature of 80° C. and was fired at a temperature of 550° C. to produce a catalyst particle including the Pt-supporting rutile titanium dioxide catalyst particle dispersed on $Al_2O_3$ powders.

Comparative Example 1

$Al_2O_3$ powders, each having a size of 5 micro-meters, were dispersed in water to produce a water solution. While continuously stirring the water solution, $H_2PtCl_6$ precursor was added thereto so that a content of Pt was 4 parts by weight based on 100 parts by weight of $Al_2O_3$ solid content. The $Al_2O_3$ aqueous solution containing the Pt precursor was stirred for 2 hours at a temperature of 60° C. The solution was dried at a temperature of 80° C. for 24 hours. The dried mixture was fired at 550° C. for 2 hours to produce $Al_2O_3$ catalyst particle loaded with Pt.

<Evaluation>

Experimental Example 1

The catalyst particles of the Present Examples and Comparative Examples were observed with HAADF-STEM (High-Angle Annular Dark-Field Scanning-Transmission Electron Microscopy, Titan cubed G2 60-300 (Double Cs corrected), FEI company).

Specifically, HAADF-STEM photograph of a $TiO_2$ catalyst particle loaded with Pt of Present Example 1 is shown in (a) of FIG. 1. HAADF-STEM image of a Pd-supporting $TiO_2$ catalyst particle of Present Example 2 are shown in FIG. 1 (b). HAADF-STEM image of the $TiO_2$ catalyst particle loaded with Rh of Present Example 3 is shown in FIG. 1 (c). The HAADF-STEM photograph of a $TiO_2$ catalyst particle loaded with Pt dispersed on $Al_2O_3$ powder of Present Example 4 is shown in FIG. 1 (d). The HAADF-STEM image of a Pt-supporting $Al_2O_3$ catalyst particle of Comparative Example 1 is shown in FIG. 1 (e).

As an image contrast is indicated using an atomic number, a bright white spherical particle in FIG. 1 represent the noble metal. A cylindrical particle with a dark gray shade around the white spherical particle represents $TiO_2$. Further, in FIGS. 1 (d) and (e), darker gray clouds represent $Al_2O_3$.

As shown in (a) to (c) of FIG. 1, the catalyst particle of Present Examples 1 to 3 contains a uniformly dispersed noble metal particle (Pt, Pd, Rh) having an average particle diameter of about 1 nm. Further, in FIG. 1 (d), in the catalyst particle of Present Example 4, Pt having an average particle diameter of 3 nm is uniformly dispersed.

To the contrary, as shown in (e) of FIG. 1, it may be seen that the catalyst particle of Comparative Example 1 supports Pt having an average particle diameter of about 5 nm.

Experimental Example 2

We preformed aging treatment of the catalyst particle of the Present Example 4 and Comparative Example 1 at 750° C. for 24 hours. Then, a change in a shape of the catalyst particle was observed by HAADF-TEM (High-Angle Annular Dark-Field Transmission Electron Microscopy, JEM-3011 (HR), JEOL Ltd.).

Specifically, the HAADF-TEM photograph of the $TiO_2$ catalyst particle loaded with Pt dispersed on $Al_2O_3$ powder of Present Example 4 is shown in FIG. 2 (a). The HAADF-TEM photograph of the Pt-supporting $Al_2O_3$ catalyst particle of Comparative Example 1 is shown in FIG. 2 (b).

As an image contrast is indicated using an atomic number, a bright white spherical particle in FIG. 2 represent the noble metal. A cylindrical particle with a dark gray shade around the white spherical particle represents $TiO_2$. Further, in FIGS. 1 (d) and (e), darker gray clouds represent $Al_2O_3$.

As shown in (a) of FIG. 2, it may be seen that in the catalyst particle of Present Example 4, the noble metal grows to have an average particle diameter of about 5 nm, and aggregates or grows to have an average particle diameter of up to about 80 nm and aggregates. In the catalyst particle of Example 4, it may be seen that the noble metal grows to have an average particle diameter of about 50 nm on average and aggregates.

On the other hand, as shown in (b) of FIG. 2, in the catalyst particle of Comparative Example 1, the noble metal Pt grows to have an average particle diameter of about 10 nm, and aggregates or grows to have an average particle diameter of up to about 200 nm and aggregates. In the catalyst particle of Comparative Example 1, it may be seen that the noble metal grows to have an average particle diameter of about 100 nm on average and aggregates.

That is, when the catalyst particle does not contain the semiconductor nanoparticle supporting the noble metal thereon, the noble metal grow and aggregate at a rate of about 2 times of a rate when the catalyst particle contains the semiconductor nanoparticle supporting the noble metal thereon. This accelerates the aging of the catalyst, leading to a significant drop in catalyst life.

What is claimed is:

1. A catalyst particle for treating vehicle exhaust gas, wherein the catalyst particle includes a semiconductor nanoparticle, and a noble metal supported on the semiconductor nanoparticle,
   wherein an average diameter of a particle made of the noble metal dispersed on the semiconductor nanoparticle is in a range of 1 nm to 30 nm, and
   wherein the catalyst particle further includes a porous ceramic carrier.

2. The catalyst particle of claim 1, wherein the noble metal includes one selected from the group consisting of ruthenium (Ru), rhodium (Rh), palladium (Pd), osmium (Os), iridium (Ir), platinum (Pt) and combinations thereof.

3. The catalyst particle of claim 1, wherein the noble metal is dispersed on the semiconductor nanoparticle via light irradiation.

4. The catalyst particle of claim 1, wherein the noble metal is contained in an amount of 1 to 50 parts by weight relative to 100 parts by weight of the semiconductor nanoparticle solid.

5. The catalyst particle of claim 1, wherein the semiconductor nanoparticle includes one selected from the group consisting of titanium dioxide ($TiO_2$), tungsten trioxide ($WO_3$), silicon carbide (SiC), cerium dioxide ($CeO_2$), zirconium dioxide ($ZrO_2$), iron oxide ($Fe_2O_3$), and combinations thereof.

6. The catalyst particle of claim 5, wherein the titanium dioxide includes rutile titanium dioxide.

7. The catalyst particle of claim 1, wherein the porous ceramic carrier includes one selected from the group consisting of aluminum oxide ($Al_2O_3$), ceria ($CeO_2$), zirconia ($ZrO_2$), silica ($SiO_2$), titanium dioxide ($TiO_2$), silicon carbide (SiC), cerium zirconium oxide and combinations thereof.

8. The catalyst particle of claim 1, wherein a weight ratio between the semiconductor nanoparticle and the porous ceramic carrier is in a range of 1:1:to 1:100.

9. A method for preparing catalyst particle for treating vehicle exhaust gas, the method including:
   mixing a noble metal precursor with a suspension containing a semiconductor nanoparticle dispersed therein to form a mixture;
   irradiating light to the mixture to produce a semiconductor nanoparticle supporting a noble metal thereon;
   preparing the suspension, wherein the semiconductor nanoparticle in which the noble metal is dispersed and a porous ceramic carrier are dispersed in water;
   drying the suspension to produce a dried product; and
   after drying the suspension, firing the dried product under a temperature condition of 300° C. to 700° C.,
   wherein an average diameter of a particle made of the noble metal dispersed on the semiconductor nanoparticle is in a range of 1 nm to 30 nm.

10. The method of claim 9, wherein the mixture further contains a sacrificial agent.

11. The method of claim 10, wherein the sacrificial agent includes one selected from the group consisting of methanol, ethanol, isopropanol, formic acid, acetic acid and combinations thereof.

12. The method of claim 10, wherein a content of the sacrificial agent is in a range of 0.1 to 50 parts by weight based on 100 parts by weight of the mixture between the noble metal precursor and the suspension.

\* \* \* \* \*